United States Patent
Peterson et al.

(10) Patent No.: US 6,616,960 B2
(45) Date of Patent: Sep. 9, 2003

(54) BAKED GOOD COVERED WITH SUGAR-FREE CREAM ICING

(75) Inventors: Dorothy Peterson, St. John, IN (US); Eric Hakmiller, Vaucressen (FR)

(73) Assignee: Cerestar Holding, B.V. (NL)

(*) Notice: Subject to any disclaimer, the term of this patent is extended or adjusted under 35 U.S.C. 154(b) by 0 days.

(21) Appl. No.: 09/441,752

(22) Filed: Nov. 17, 1999

(65) Prior Publication Data

US 2003/0152683 A1 Aug. 14, 2003

Related U.S. Application Data

(60) Provisional application No. 60/108,818, filed on Nov. 17, 1998.

(51) Int. Cl.⁷ .......................... A21D 13/08; A23G 3/00; A23L 1/236
(52) U.S. Cl. ....................... 426/548; 426/549; 426/653; 426/659
(58) Field of Search ............................. 426/548, 653, 426/658, 659, 660, 549

(56) References Cited

U.S. PATENT DOCUMENTS

| | | | | |
|---|---|---|---|---|
| 5,041,541 A | * | 8/1991 | Mazur | 536/11 |
| 5,063,080 A | | 11/1991 | Kruger et al. | 426/660 |
| 5,304,389 A | * | 4/1994 | Kondo et al. | 426/659 |
| 5,436,329 A | | 7/1995 | Caboche | 536/103 |
| 5,571,547 A | | 11/1996 | Serpelloni et al. | 426/103 |
| 5,711,975 A | | 1/1998 | Gonze et al. | 426/3 |

FOREIGN PATENT DOCUMENTS

| | | |
|---|---|---|
| EP | 0676147 | 10/1995 |
| EP | 0688502 | 12/1995 |
| EP | 0800823 | 10/1997 |
| EP | 1002466 | * 5/2000 |
| JP | 1174332 | 7/1989 |
| JP | 1225458 | 9/1989 |
| WO | 94 10406 | 5/1994 |

* cited by examiner

Primary Examiner—Arthur L. Corbin
(74) Attorney, Agent, or Firm—Muserlian, Lucas and Mercanti

(57) ABSTRACT

The sugar-free cream icing use to cover a baked good employs a sugar-free composition of 50–100% erythritol, 0–50% bulking agent, 0–1% emulsifier, and 0–1% high intensity sweetener. The icing employs 50–70% of the sugar-free composition, 10–50% shortening and 5–20% water.

13 Claims, No Drawings

BAKED GOOD COVERED WITH SUGAR-FREE CREAM ICING

This application claims the benefit of U.S. Provisional App. No. 60/108,818 filed Nov. 17, 1998.

BACKGROUND OF THE INVENTION

1. Field of the Invention

This invention relates to cream icings used for baked goods and, more particularly, to a sugar-free cream icing having reduced calorie content which is suitable for use by diabetics.

2. Prior Art

Cream icings are used to cover baked goods such as cakes, cup cakes and cookies. They add sweetness and decoration to the baked goods.

Conventionally, cream icings are made from a mixture of sugar, shortening and water, where the sugar makes up a substantial portion of the icing composition. Typically, sucrose is the sugar component in cream icings. The sugar performs a number of functions in the icing composition. Besides adding sweetness, it also acts as a bulking agent and provides strength to the icing composition.

In the manufacture of sugar-free icings, the sugar is removed from the formulation and replaced with a bulking agent that attempts to mimic the functionality of the sugar in the icing. Typically, the sugar is replaced with a sugar alcohol, hydrogenated starch, hydrolysates, isomalt, lactitol, maltitol, mannitol, sorbitol, xylitol and polydextrose. These sugar replacements have shortcomings. Some of these shortcomings include limited caloric reduction, gastrointestinal side effects which limit their use, lack of storage stability, and insufficient texture and bulking properties.

There is a need to find a replacement for the sugar component in cream icings which provides a sugar-free icing, allows for a reduction in the caloric content of the icing, while still mimicking the functionality of the sugar without the gastrointestinal side effects of known sugar substitutes.

SUMMARY OF THE INVENTION

A sugar-free cream icing composition with reduced caloric content has now been discovered wherein erythritol is employed along with a bulking agent, an emulsifier and a high intensity sweetener to replace the sugar component in the icing composition.

The use of erythritol in the icing composition provides distinct functional and nutritional benefits compared to other sugar substitutes. Erythritol can replace over 50% of the weight and volume of the sucrose, has a very low calorie content (compared to other known sugar substitutes), is well tolerated without gastrointestinal side effects, and does not affect blood glucose or insulin levels.

It has been found that, when erythritol is combined with bulking agents, emulsifiers, and high intensity sweeteners, the texture and shelf life properties of the icing are comparable to a conventional sucrose based cream icing.

Due to its small molecular size, erythritol behaves completely different from other polyols that are used as sugar substitutes, in that it is absorbed quickly, is not subject to metabolic conversion in the body, and has a high digestive tolerance. In addition, the low solubility and excellent crystalline structure allow erythritol, in combination with a bulking agent, emulsifier and high intensity sweetener, to mimic the functional properties of sucrose in conventional cream icings. Thus, the cream icings of the present invention are comparable to conventional sugar-based cream icings.

The cream icing composition of the present invention has good water activity control and good shelf life.

Because erythritol acts as a sweetener, but is not broken down by the digestive tract, it reduces the caloric content of the icing composition while still providing sweetness to the icing.

Broadly, a sugar-free composition for use as a replacement for sugar in a conventional cream icing in accordance with the present invention comprises: erythritol; a bulking agent; an emulsifier; and a high intensity sweetener. Suitably, the erythritol makes up at least about 50% by weight or more of the sugar-free composition.

A sugar-free cream icing composition made in accordance with the present invention comprises: the sugar-free composition of the present invention; shortening; and water. The present invention can also be viewed as an improvement over conventional sugar-free icings which comprises: a sugar substitute; shortening; and water wherein the improvement is replacing at least a portion of the sugar substitute with an effective amount of the sugar-free composition of the present invention. The amount of sugar-free composition is effective to reduce the caloric content of the icing or reduce gastrointestinal side effects of the conventional, sugar substitute.

DETAILED DESCRIPTION OF THE INVENTION

The sugar-free composition of the present invention preferably comprises about 50% to about 100% of erythritol; about 0% to about 50% of a bulking agent; about 0% to about 1% of a high intensity sweetener; and about 0% to about 1% of an emulsifier. These are weight percents based on total weight of the sugar-free composition. More preferably, the sugar-free composition of the present invention comprises: about 65% erythritol; about 35% of a bulking agent; about 0.3% of an emulsifier; and about 0.3% of a high intensity sweetener.

The sugar-free cream icing of the present invention suitably comprises about 50% to about 75% of the sugar-free composition of the present invention; about 10% to about 50% of a shortening; and about 5% to about 20% water. These are weight percents based on the total weight of the icing composition. More preferably, the icing composition of the present invention comprises about 65% of the sugar-free composition of the present invention; about 20% shortening; and about 10% water with a remainder of other ingredients, such as flavorings, colorings and preservatives.

The sugar-free composition of the present invention is used to replace at least about 50% of the conventional sugar substitutes in a sugar-free cream icing and, more preferably, about 100% of the sugar substitute in a conventional sugar-free icing. These percentages are based on weight percents. The replacement is conducted in a 1:1 weight basis, e.g. replace 2 grams of a conventional sugar substitute with 2 grams of the sugar-free composition of the present invention.

Any source of erythritol can be employed in the present invention. Suitable sources include erythritol obtained from starch. One such commercially available source of erythritol is C★Eridex from Cerestar USA, Inc. of Hammond, Ind., USA.

Suitable bulking agents for use in the present invention include polyols, starch, starch hydrolysates, hydrogenated starch hydrolysates, and polydextrose. Suitable polyols include sugar alcohols having the general formula $CH_2OH-(CHOH)_n-CH_2OH$ wherein n may be from 2 to 5. Conventional polyols used in foods such as isomalt, lactitol, maltitol, mannitol, sorbitol and xylitol are suitable for use in the present invention as bulking agents. Suitable starches include starch obtained from corn, potato, wheat and rice. Suitable starch hydrolysates are maltodextrins and especially low DE maltodextrins. The maltodextrin can be from any source of starch to corn, wheat, potato, and rice.

Suitable high intensity sweeteners include saccharine, aspartame and acesulfame-k.

Suitable emulsifying agents include any conventional emulsifier suitable for food use such as lecithin and polysorbate.

The shortening employed in the present invention is any conventional shortening used in cream icings. No special water need be employed, just potable water.

Conventional flavorings and colorings can be included in the cream icing composition of the present invention. Suitable colorings include food dyes to color the icing. Suitable flavorings include chocolate, butterscotch, peanut butter, vanilla, strawberry, and coffee.

Since the cream icing composition of the present invention is intended for packaging and sale in grocery stores, it is conventional to include a preservative in the composition.

The sugar-free composition of the present invention can be premixed and sold as a mix or the user can obtain the individual components and mix them together when preparing the sugar-free cream icing.

The cream icing of the present invention is made in a conventional manner using conventional equipment by mixing together the components of the sugar-free composition of the present invention.

Replacement of a conventional sugar substitute in a cream icing with the sugar-free composition of the present invention is done in a conventional manner in accordance with the present invention.

These and other aspects of the present invention may be more fully understood by reference to one or more of the following examples.

EXAMPLE 1

This example illustrates making a sugar-free cream icing with the sugar-free composition of the present invention and compares the sugar-free cream icing of the present invention with a conventional cream icing. The following two icings were prepared and tested.

| Control Icing | | Sugar-Free Icing of the Present Invention | |
|---|---|---|---|
| Powdered Sugar | 68.4 | Erythritol | 42.0 |
| NFDM | 4.0 | NFDM | 4.0 |
| Salt (flour) | 0.6 | Salt (flour) | 0.6 |
| Emulsified Shortening | 19.0 | Corn Starch | 5.0 |
| Water | 7.8 | Potato Maltodextrin | 5.0 |
| Vanilla | 0.2 | Water | 10.0 |
| | | Maltitol Syrup | 12.8 |
| | | Emulsified Shortening | 20.0 |
| | | Polysorbate 60 | 0.2 |
| | | Vanilla | 0.2 |
| | | Aspartame | 0.2 |

The powdered sugar is sucrose, the erythritol was obtained for Cerestar under the trademark C★Eridex 16951. The aspartame was NutraSweet Custom Liquid 50. The corn starch was a conventional common corn starch. NFDM is non-fat dry milk. The corn starch, potato maltodextrin, and maltitol syrup are bulking agents used in accordance with the present invention.

To make the control icing, the sugar, salt and NFDM were sifted together and then creamed with the shortening. The vanilla and water were then added and mixed together at high speed to a specific gravity of 0.70 to 0.75.

To make the cream icing of the present invention, the erythritol, NFDM, salt, corn starch and potato maltodextrin were mixed together and then creamed with the shortening and the polysorbate. Water, vanilla, aspartame and maltitol syrup were then added and mixing was conducted at a high speed to a specific gravity of 0.70 to 0.75.

The cream icing composition of the present invention included low levels of maltitol syrup and aspartame to enhance sweetness, the use of stabilizers (and additional water) to increase opacity and texture, and the use of emulsifiers to lower the specific gravity.

Specific gravity, water activity, viscosity, and textural analysis was measured for both the control and the present invention. Results were as follows:

| | Control | Present Invention |
|---|---|---|
| Specific gravity | 0.74 | 0.72 |
| Water activity | 0.767 @ 27.3 C. | 0.796 @ 29.2 C. |
| Helipath viscosity | 467,000 cps | 489,000 cps |
| Texture (Stevens QTS 25) | | |
| Hardness | 290.0 g | 306.0 g |
| Cohesiveness | 0.766 | 0.705 |
| Gumminess | 222.03 g | 215.58 g |
| Chewiness | 4283.0 gmm | 4053.0 gmm |
| Adhesiveness | 5070.0 gs | 5375.60 gs |

All tested attributes are comparable for the present invention and control products.

These tests were conducted in a conventional, manner using conventional equipment.

Shelf life was determined by testing viscosity and texture over three days.

|  | Control | | | Present invention | | |
| --- | --- | --- | --- | --- | --- | --- |
|  | Day 1 | Day 2 | Day 3 | Day 1 | Day 2 | Day 3 |
| Helipath Viscosity (cps) | 467,000 | 627,100 | 618,000 | 489,000 | 648,000 | 664,900 |
| Texture Analysis (Stevens QTS25) | | | | | | |
| Hardness (g) | 290.0 | 375.0 | 370.0 | 306.0 | 323.0 | 374.0 |
| Cohesiveness | 0.766 | 0.683 | 0.691 | 0.705 | 0.808 | 0.675 |
| Gumminess (g) | 222.0 | 255.0 | 255.8 | 215.6 | 260.9 | 252.6 |
| Chewiness (gmm) | 4283.0 | 4893.6 | 4917.3 | 4053.0 | 4904.6 | 4920.0 |
| Adhesiveness (gs) | 5070.0 | 6949.8 | 6829.6 | 5377.6 | 5593.0 | 6297.6 |

No significant differences were noted between these products over the three day shelf life.

Sensory testing was also conducted to compare attributes and determine overall acceptability.

| Attribute | Control | Present invention |
| --- | --- | --- |
| Appearance (Creamy/Pasty) | 7.1 | 7.0 |
| Mouthfeel (Smooth/Gritty) | 6.9 | 6.8 |
| Sweetness (Low-Intense) | 9.1 | 8.0 |
| Vanilla (Low-Intense) | 7.5 | 8.7 |
| Cooling Effect (Non/Intense) | 0.4 | 9.2 |
| Overall (Like/Dislike) | 4.8 | 5.7 |

Panelist rated the various attributes on a 0 to 15 close ended scale. The only statistically different rating was in the cooling effect. Surprisingly, this did not influence the overall rating.

Caloric content was calculated for a 33.3 gm serving size (approx. 2 TBS.). The calories for the control are 149 Kcal and 74.8 Kcal for the present invention. A 50% reduction was achieved using the icing composition of the present invention.

It will be understood that the claims are intended to cover all changes and modifications of the preferred embodiments of the invention herein chosen for the purpose of illustration which do not constitute a departure from the spirit and scope of the invention.

What is claimed is:

1. In a baked good covered with a sugar-free cream icing composition the improvement comprising: said sugar-free icing composition comprising:
   about 50% to about 75% by weight sugar-free component;
   about 10% to about 50% by weight shortening; and
   about 10% to about 20% by weight water;
   wherein said sugar-free component consists of:
      erythritol in an amount of about 50% to about 100% by weight;
      a bulking agent in an amount of about 0% to about 50% by weight;
      a high intensity sweetener in an amount of about 0% to about 1% by weight; and
      an emulsifier in an amount of about 0% to about 1% by weight.

2. The baked good of claim 1 wherein the baked good is a cake, a cupcake, or a cookie.

3. The baked good of claim 1 wherein said bulking agent is selected from the group consisting of polyols, starch, starch hydrolysate, hydrogenated starch hydrolysate and polydextrose.

4. The baked good of claim 1 wherein said high intensity sweetener is selected from the group consisting of saccharin, aspartame and acesulfame-k.

5. The baked good of claim 1 wherein said emulsifier is selected from the group consisting of lecithin and polysorbate.

6. The baked good of claim 1 wherein said polyol is selected from the group consisting of isomalt, lactitol, maltitol, mannitol, sorbitol and xylitol.

7. The baked good of claim 1 wherein said polyol is a sugar alcohol having the formula:

$$CH_2OH-(CHOH)_n-CH_2OH$$

wherein n is an integer from 2 to 5.

8. The baked good of claim 1 wherein said starch is a starch selected from the group consisting of corn starch, potato starch, wheat starch, and rice starch.

9. The baked good of claim 1 wherein said starch hydrolysate is maltodextrin.

10. The baked good of claim 1 wherein said bulking agent is selected from the group consisting of corn starch, potato maltodextrin, and maltitol, said high intensity sweetener is aspartame; and said emulsifier is polysorbate.

11. The baked good of claim 4 wherein said bulking agent is selected from the group consisting of a polyol, starch, starch hydrolysate, hydrogenated starch hydrolysate and polydextrose;
   said high intensity sweetener is selected from the group consisting of saccharin, aspartame and acesulfame-k; and
   said emulsifier is selected from the group consisting of lecithin and polysorbate.

12. The baked good of claim 1 wherein said icing composition comprises:
   about 65% by weight said sugar-free component;
   about 20% by weight shortening;
   about 10% by weight water; and
   a remainder of flavoring, coloring and preservatives.

13. The baked good of claim 1 wherein said sugar-free component comprises:
   about 65% by weight erythritol;
   about 35% by weight bulking agent;
   about 0.3% by weight emulsifier; and
   about 0.3% by weight of a high intensity sweetener.

* * * * *